United States Patent
Dafesh

(10) Patent No.: US 7,042,930 B2
(45) Date of Patent: May 9, 2006

(54) SPREAD SPECTRUM BIT BOUNDARY CORRELATION SEARCH ACQUISITION SYSTEM

(75) Inventor: Philip A. Dafesh, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 804 days.

(21) Appl. No.: 10/165,662

(22) Filed: Jun. 6, 2002

(65) Prior Publication Data
US 2003/0227963 A1   Dec. 11, 2003

(51) Int. Cl.
H04B 1/69      (2006.01)
H04B 1/00      (2006.01)

(52) U.S. Cl. .................. 375/149; 375/343; 375/142; 375/150

(58) Field of Classification Search ............ None
See application file for complete search history.

(56) References Cited

U.S. PATENT DOCUMENTS 5,946,344 A * 8/1999 Warren et al. .............. 375/150
2003/0174792 A1 * 9/2003 Bow et al. .................. 375/343

* cited by examiner

Primary Examiner—Stephen Chin
Assistant Examiner—Cicely Ware
(74) Attorney, Agent, or Firm—Derrick Michael Reid

(57) ABSTRACT

A multiple integration hypothesis C/A code acquisition system resolves bit boundaries using parallel correlators providing magnitude hypotheses during acquisition to reduce losses over the 20 ms integration period to improve the performance and sensitivity of C/A code receivers to achieve low C/No performance using inexpensive, imprecise oscillators and long noncoherent dwell periods, well suited for in-building, multipath, and foliage attenuated GPS signaling applicable to E911 communications with several dB of additional improvement in receiver sensitivity due to the ability to detect bit synchronization during acquisition.

14 Claims, 4 Drawing Sheets

BIT BOUNDARY CORRELATION SYSTEM

BIT BOUNDARY OFFSET TIMING

EFFECTIVE BIT COUNDARY INTEGRATION ALIGNMENT

BIT BOUNDARY CORRELATION SYSTEM

Mt TAP VECTOR CORRELATOR

SPREAD SPECTRUM BIT BOUNDARY CORRELATION SEARCH ACQUISITION SYSTEM

FIELD OF THE INVENTION

The invention relates to the field of spread spectrum acquisition and correlation communication systems. More particularly, the present invention relates to bit boundary detection to improve correlation of spread spectrum signals.

BACKGROUND OF THE INVENTION

The availability to obtain a GPS navigation solution is limited by an ability of a receiver to acquire the GPS signal in the presence of interference such as foliage attenuation encountered in forest, in-building attenuation cause by large structures, and multipaths caused by signal path reflections and obstructions. Particularly, attenuation encountered during in-building GPS reception, such as when GPS receivers are integrated into cell phones, limits the use of emergency GPS applications. These conditions make it desirable to fully exploit the available GPS signal strength. One factor limiting the acquisition of a GPS signal with weak signal levels is the processing gain in the presence of interference. This is especially critical for in-building and urban applications of GPS receivers.

Usually, it is desirable to maximize the coherent integration period to maximize the processing gain in a GPS receiver. The coherent integration period is typically limited to the data bit period. In acquisition of the P(Y) code signal, the non-repetitive nature of the code, and the coherency of the code to the GPS data message will precisely determine the bit boundaries relative to the start of the integrate and dump period. Due to the design of the GPS course acquisition (C/A) code, used by commercial GPS receivers, the code period of 1 ms is much less than the 20 ms period of the GPS data bit. As a result of the ambiguity of the code relative to the data bit boundary, bit synchronization is usually required as a necessary step after initial code acquisition. That is, bit synchronization is normally achieved after initial C/A code acquisition. However, bit synchronization is not required when the period of the code, such as the P(Y) code and the new L2 and L5 civil codes, is greater than or equal to the data bit period because the bit boundaries are not ambiguous after code acquisition. It is desirable to acquire the C/A code with the greatest possible coherent integration period. Due to integration across random data bit boundaries, a C/A code receiver incurs additional losses depending upon the relative phase of the integrate and dump clock and the start of a bit boundary. For the C/A code acquisition, the integration may start at some random bit boundary offset within a bit period. This bit synchronization offset leads to poor signal reception and disadvantageously requires bit synchronization after code acquisition.

For the C/A code, having a 1.0 ms code period, the processing gain is maximized by integration over the 20 ms bit period. In order to precisely integrate and dump over a 20 ms bit period, the integration period must be aligned, that is, synchronized, to bit boundaries. Thus, bit boundary determination during signal acquisition can improve receiver sensitivity to weak signals. For the C/A code, these boundaries are known only to within some multiple of the 1 ms C/A code periods. Consequently, the start of an integration period can be offset by as much as 10 ms from the start of a bit boundary when the 20 ms integration period is used. Consequently, the acquisition process is usually limited to small integration periods to avoid increased signal losses due to lack of bit boundary synchronization prior to carrier tracking. As the C/A code is initially acquired by conventional code phase determination, bit boundaries will not be synchronized with the integration period, and hence conventional methods require noncoherent integration to mitigate these signal losses. Noncoherent integration results in reduced receiver sensitivity during signal acquisition.

While wireless assisted GPS aiding has been to reduce initial time uncertainty to enable bit boundary determination during acquisition, thereby maximizing processing gain, such aiding disadvantageously requires reliance on a wireless network. Conventional signal acquisition methods do not eliminate the need for wireless assistance to resolve bit boundary offsets and do not maximize coherent integration period, and hence, do not maximize the processing gain during acquisition resulting in poor reception of weak signals during signal acquisition. These and other disadvantages are solved or reduced using the invention.

SUMMARY OF THE INVENTION

An object of the invention is to provide a correlation system that integrates over a bit duration.

Another object of the invention is to provide a correlation system that achieves bit synchronization during acquisition.

Yet another object of the invention is to provide a correlation system that integrates over a bit duration for achieving bit synchronization during acquisition.

Still another object of the invention is to provide a correlation system that integrates and dump over a bit duration for improved processing gain and resultant improved signal reception.

Yet a further object of the invention is to provide a correlation system that integrates and dumps precisely over a bit duration for improved processing gain while achieving bit synchronization during acquisition, using a parallel correlators for generating respective hypothesis and selecting one of the hypothesis that corresponds to synchronized integration over the bit period.

The invention is directed to a system for detecting bit boundaries during the acquisition process of a code having multiple code periods for each data bit. The system reduces losses by determining bit boundary during code acquisition precisely to the bit boundaries prior to carrier tracking. The system enables rapid acquisition, improved coherent integration and dump functions for enhanced receiver sensitivity. An exemplar system is applicable to commercial C/A code GPS receivers where the bit period is a multiple of the code period. The integration period extends the duration of a data bit period, such as the 20 ms bit period. The system provides synchronized integration function during signal acquisition, prior to carrier loop pull-in and conventional bit synchronization. This sensitivity enhancement is achieved by resolving unknown bit boundary relative to code synchronization upon acquisition of the C/A code by searching over multiple integration hypotheses corresponding to the twenty possible synchronization positions, that is twenty possible offsets, of the C/A code relative to a bit boundary.

For acquisition of a code that enables concurrent bit boundary synchronization, the coherent integration period is limited to bit duration and bit synchronization is obtained when the code is acquired because the code is longer than the bit duration. During acquisition, the integration period starts and stops on data bit boundaries where the bit duration edges start an integration period. When a coherent integration period starts on a bit boundary, there are no data bit sign flips during the integration. When the integration is not aligned with the start of a bit boundary, an offset search is performed. The staggered code phases are synchronized to respective staggered integrate and dump clocks, and twenty correlation hypothesis are generated, and one hypothesis is selected based on a selection search algorithm for selecting that offset corresponding to the bit boundary offset, in order to precisely, that is coherently, integrated and dump over the 20 ms bit period. The integration period is aligned to bit boundaries and hence, bit boundaries are firstly determined for optimizing coherent correlations and improved receiver sensitivity during acquisition while also providing bit timing. Parallel correlators of a GPS receiver acquisition system use staggered code time offsets when multiplying the replica code references by received I and Q signals. These parallel correlators include conventional integrate and dump stages that coherently integrates successive samples to form complex correlator outputs, where the integration directly determines a voltage level. Multiple code period offsets over a bit duration provide staggered integration and dump clocks to respective correlators and magnitude generator for generating respective offset hypotheses. The correlation hypothesis are examined and the correct offset of the integrate and dump clock is selected that maximizes the likelihood of bit to code synchronization. A maximum signal from one of the parallel correlators is achieved when the replica code is offset, that is, synchronized to the incoming data bit period, and hence the parallel correlation provides an indication of which offset is aligned to the bit boundary.

The system uses accurate crystal oscillators for several dB of sensitivity improvement, adequate under weak signal environments. The method can readily be implemented by several GPS receiver manufacturers of GPS chip sets for cell phone and personal data assistant applications. Enhanced performance of C/A code GPS receivers under weak signal conditions is well suited for in-building applications, such as used in E911 cell phone applications where inexpensive, chip size, GPS receivers will be in wide-spread use. The processing gain is improved by coherent accurate integration over the entire bit duration, while concurrently providing bit synchronization during acquisition. These and other advantages will become more apparent from the following detailed description of the preferred embodiment.

DETAILED DESCRIPTION OF THE PREFERRED EMBODIMENT

Figure 1:
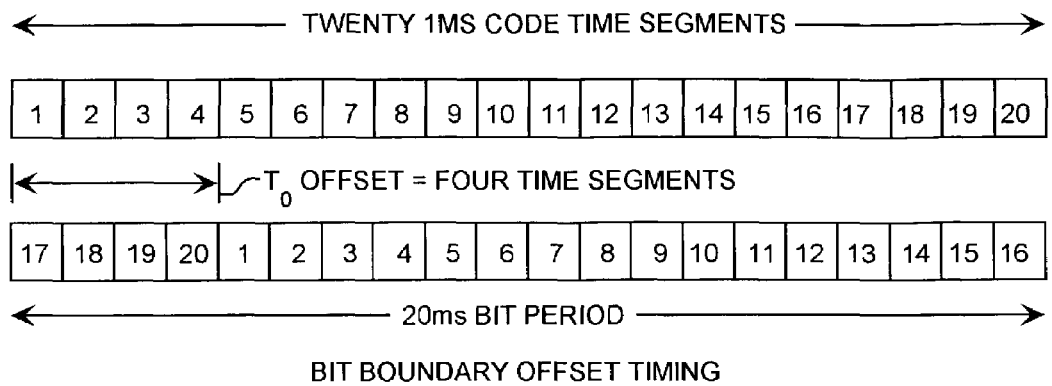
FIG. 1 is a timing diagram of an exemplar bit boundary offset.
Figure 2:
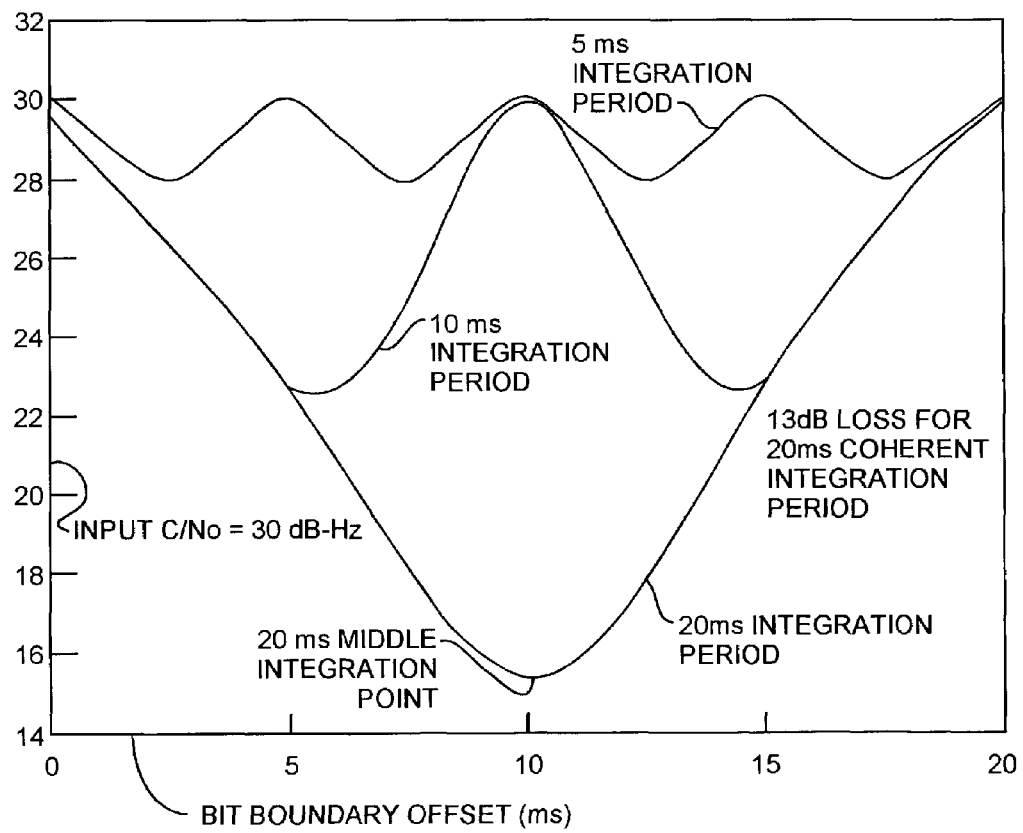
FIG. 2 is a performance graph of signal to noise ratios of correlations over bid boundaries extending through a bit period.

An embodiment of the invention is described with reference to the figures using reference designations as shown in the figures. Referring to FIGS. 1 and 2, showing the result of a spread spectrum communication system that uses a spreading code that has a number of code periods occurring during each data bit, and, the duration of a data bit is a multiple of the duration of the code period, such as multiples of five, ten and twenty. In the case of the C/A code, twenty 1 ms code periods occur for each 20 ms data bit duration. The start of a data bit is synchronized to the start of a code period. The integration period extends the duration of the bit period, but during acquisition, can start at anyone of the 20 code periods relative to the bit duration boundaries, and hence, the integration period can be offset in multiple of 1 ms code periods from the bit boundaries.

The effective carrier to noise power spectral density ratio (C/No) for a sliding correlator can be simulated as a function of bit boundary offsets, such as for exemplar integration periods of 5 ms, 10 ms and 20 ms. The integration period extends over the entire bit duration. When the offset is at the mid point of the bit duration, such as the mid point 10 ms of the 20 ms bit duration, the effective C/No ratio is at a lowest point degrading receiver sensitivity. The effective processing C/No ratio is maximized when the integration period is coherent with, that is, synchronized to, the bit boundaries. The integrate and dump period is initially, typically, offset from the bit boundaries due to the twenty repeated code periods within each data bit period for the C/A code. The C/A code replica, synchronized to the integration period, is offset by $\Delta t_0$ from the true bit boundary of the received C/A code. As a result, the start of the integration period may be offset from the data bit boundary by a multiple of the 1 ms C/A code periods resulting in appreciable signal loss when the integration period is greater than 1 ms. Using the invention for examining integration and dump correlation values over the offset periods, the offset in multiple of the code periods can be determined. When selecting the correct offset, the effective C/No ratio is improved by several dB for improved receiver sensitivity. By offsetting the replica code, and hence, by offsetting the integration period, the integration period is aligned precisely with the bit duration for maximum receiver sensitivity.

Figure 3:
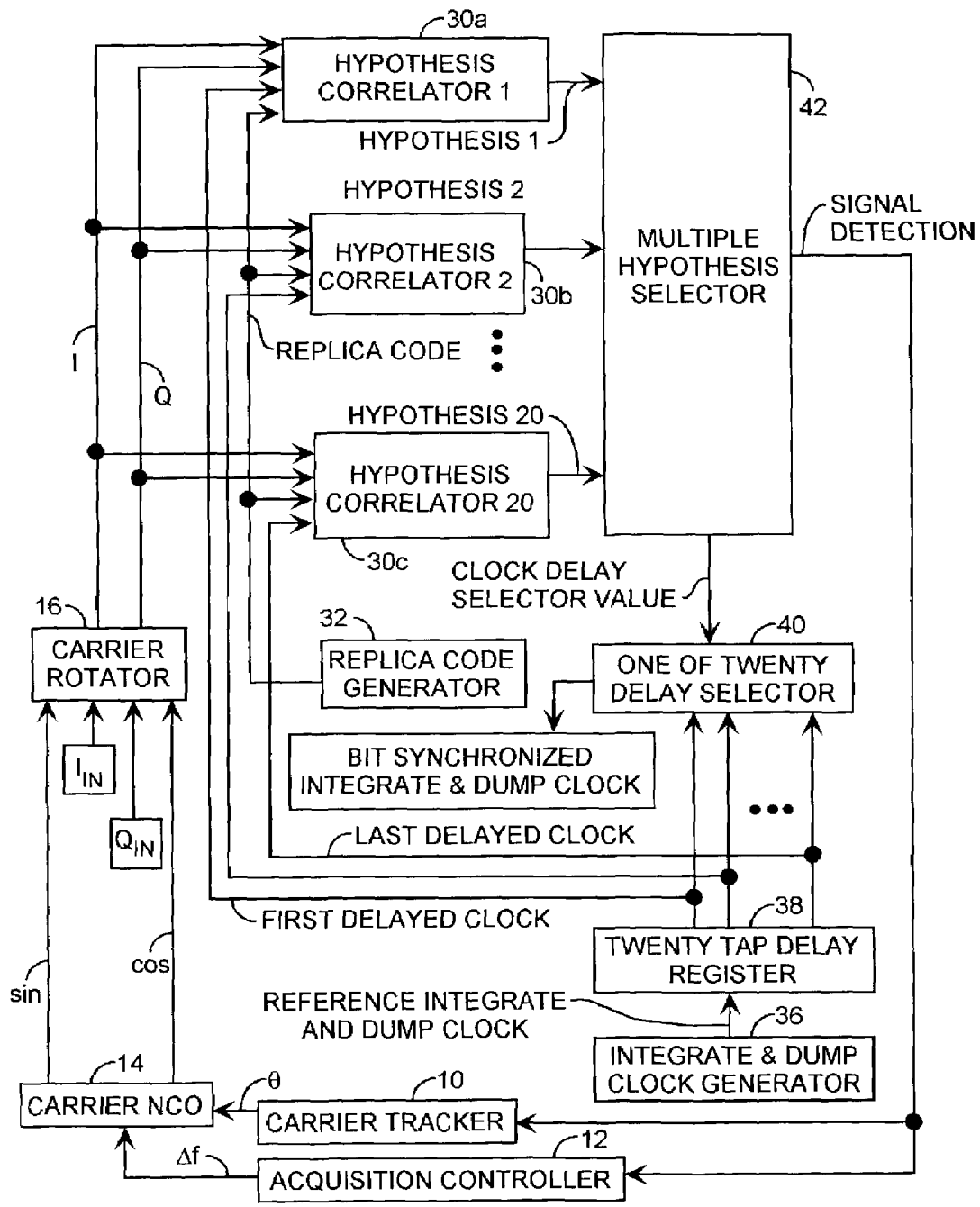
FIG. 3 is a block diagram of a bit boundary correlation system.

Referring to FIGS. 1 through 3, and more particularly to FIGS. 3, a bit boundary correlation system is preferably used in combination with a conventional carrier tracker 10 and acquisition controller 12 for driving a conventional carrier NCO 14 for providing sin and cos quadrature signals used by a conventional carrier rotator 16 for carrier rotation of received quadrature signals Iin and Qin. The carrier rotator 16 provides rotated I & Q signals to a plurality of parallel hypothesis correlators, such as hypothesis correlators 30*a* and 30*b* through 30*c*. In the case of C/A code signal acquisition, where there are twenty code periods per bit period, there are preferably a corresponding equal number of hypothesis correlators, including the first hypothesis correlator 30*a*, the second hypothesis correlator 30*b*, through the twentieth hypothesis correlator 30*c*. In the case of the C/A code, there are twenty hypotheses correlators, correlating over twenty possible integration periods with respective code period offsets.

Each of the hypothesis correlators receive a predetermined pseudorandom noise (PRN) spreading code, as a replica code that is a replica of the PRN spreading code used to spectrum spread the quadrature I and Q signals during transmission and which are received in the presence of signal attenuation along a communication link. An exemplar replica code is the C/A code that is generated by a replica code generator 32. Each of the hypothesis correlators 30*a*, 30*b* through 30*c* also receives a respective integrated and dump clock. A reference integrated and dump clock is conventionally generated by an integrate and dump clock generator 36. The reference integrated and dump clock is fed into a twenty tap delay register 38 for generating twenty delayed integrate and dump clocks, including a first delayed clock fed to the first hypothesis correlator 30*a*, a second delayed clock fed to the second hypothesis correlator 30b, through and including a last, or twentieth delayed clock fed to the last, or twentieth hypothesis correlator 30c, such that, each of the hypothesis correlators receives a staggered version of the reference integrate and dump clock, each offset for each other by the code period. System timing, not shown, but very well known, synchronizes the reference integrate and dump clock with the replica code, such that, one of the staggered delayed integrate and dump clocks is synchronized on a bit boundary so that, one of the hypothesis correlator provides precise coherent integration over the bit period suitable for improved receiver sensitivity while providing rapid bit synchronization. A one of twenty delay selector 40 is used to select one of the delayed integrate and dump clocks from the twenty tap delay register 38 that is coherently aligned to the bit duration. The selected delayed integrate and dump clock is hence a bit synchronized integrate and dump clock synchronized to the bit boundary of the bit period.

Each of the hypothesis correlators feeds a hypothesis to a multiple hypothesis selector 42 that examines the received hypotheses, and select one of hypothesis, such as that hypothesis with a maximum correlation value, as indicating best synchronization to the respective delayed integrate and dump clock that provides maximum coherent integration. The hypothesis selector 42 outputs an indication, such as the clock delay selector value signal communicated to the one of twenty delay selector 40, for selecting a respective one of the twenty delayed integrate and dump clocks, as the best bit synchronized integrate and dump clock. The selected bit synchronized integrate and dump clock used for coherent integration offers improved sensitivity during signal acquisition, as well as bit synchronization. The hypothesis selector 42 can also be used for generating a detection signal used for initial carrier lock using the carrier tracker 10, and the acquisition controller 12, for initial control of the carrier NCO 14, during carrier search and carrier tracking operations.

Various hypothesis correlator implementations can be used, including serial and parallel correlator search methods. For example, a conventional correlator having conventional integrate and dump correlators and magnitude generators could be replicated in parallel, or a single correlator sampled in series, and used for providing the correlation magnitudes serially as hypotheses to the hypothesis selector 42. The bit boundary correlation system preferably includes a plurality of identical parallel hypothesis correlators 30a, 30b through 30c, where the number of correlators 30a through 30c equals the number of code periods each data bit, which is twenty in the case of the C/A code. Each of the hypothesis correlators 30a through 30c provides respective I and Q correlations and magnitude hypotheses having signal strengths depending on respective synchronization between the respective twenty delayed integrate and dump clocks and the bit boundaries of the communicated bits communicated within the I and Q inputs. The twenty tap delayed integrate and dump clocks are hence communicated to the one of twenty delay selector for selecting one of the twenty delayed integrate and dump clock depending on a clock delay selector value from a multiple integration hypothesis selector 42. The multiple integration hypothesis selector 42 can employ various search algorithms for selecting the most likely one of the twenty delayed integration and dump clocks 20 that provide the best coherent integration though bit synchronization. One such algorithm samples magnitude values and generates a one to twenty value indicating how many code period offsets from reference, or first delayed clock, is the maximum one of the twenty magnitude hypotheses. When the correlation magnitude signal, that is the hypothesis, is above a predetermined threshold, the hypothesis selector 42 functions as a threshold detector, and hence selects a maximum magnitude above the predetermined threshold. The magnitude value of the magnitude hypothesis relates to the amount of code offset, that is, the offset between the integration period of the delayed integrate and dump clock and the bit boundary.

In so selecting the maximum correlation by sample a maximum magnitude hypothesis, the clock delay selector value selects the best offset for offsetting the code phase and hence the integration period relative to the bit boundaries. The search algorithm enables the multiple integration hypothesis selector 42 to select one of magnitude hypotheses 28 from the respective hypothesis correlator 30a through 30c for generating the clock delay selector value in turn selects or indicates the best synchronization between the bit boundaries and one of the twenty delayed integration and dump clocks 20. For example, the clock delay selector value may be an integer value from one to twenty for selecting one of the twenty delayed clocks 20 relative to the first delay clock. Having determined the offset, the bit synchronized integrate and dump clock coherentyl aligned to bit boundaries can then be used for maximum coherent integration in conventional correlators for maximum signal reception and used in conventional data detection circuits for initial rapid bit synchronization. The system can also continuously monitor the hypotheses, and adaptively adjust the bit synchronized integrate and dump clock during use and after initial acquisition and carrier and code tracking. The replica code phase is initially adjusted during signal acquisition and concurrently synchronized with the bit boundaries so as to provide bit synchronization relative to the first delayed clock under rapid closed loop acquisition with improved receiver sensitivity of a C/A Code by coherent integration.

In the general form of the invention, the multiple integration hypothesis selector 42 implements a search for generating a clock delay selector value for bit synchronization. Using conventional integrate and dump correlators, twenty time sampled magnitude correlations based on respective offsets are generated as hypotheses. With rapid increases in dense semiconductor processing methods, thousands of process integrated devices can used, which can offer correlation magnitudes over carrier frequencies and code phase times. For example, a bit boundary correlation system can employ 2046 parallel correlators for enabling searches over all C/A code phase times, and can employ 2046 respective transforms sampling over 64 different frequencies for enabling searches of magnitudes over twenty offset integration periods.

Figure 4:
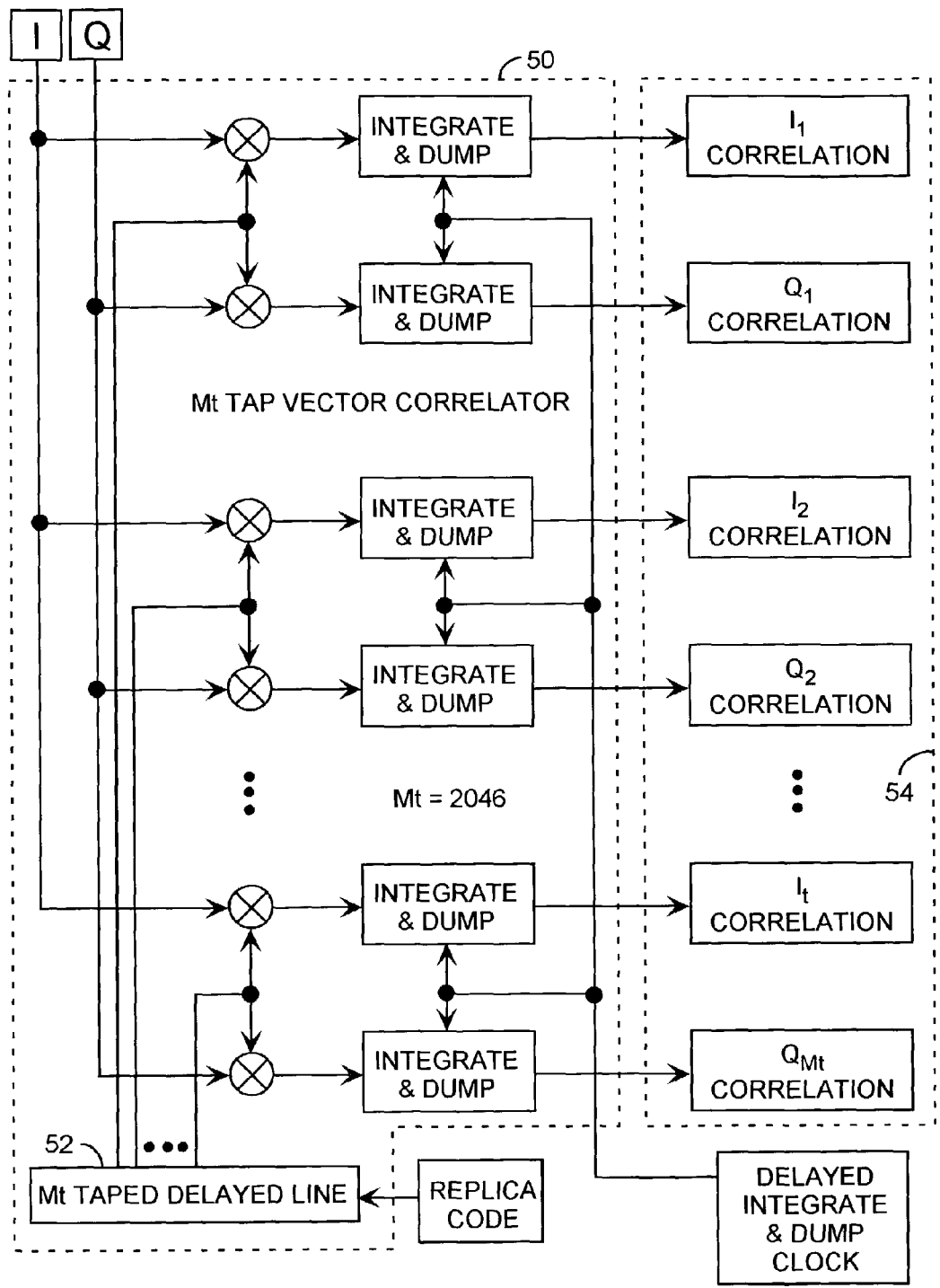
FIG. 4 is a block diagram of an Mt tap vector correlator.
Figure 5:
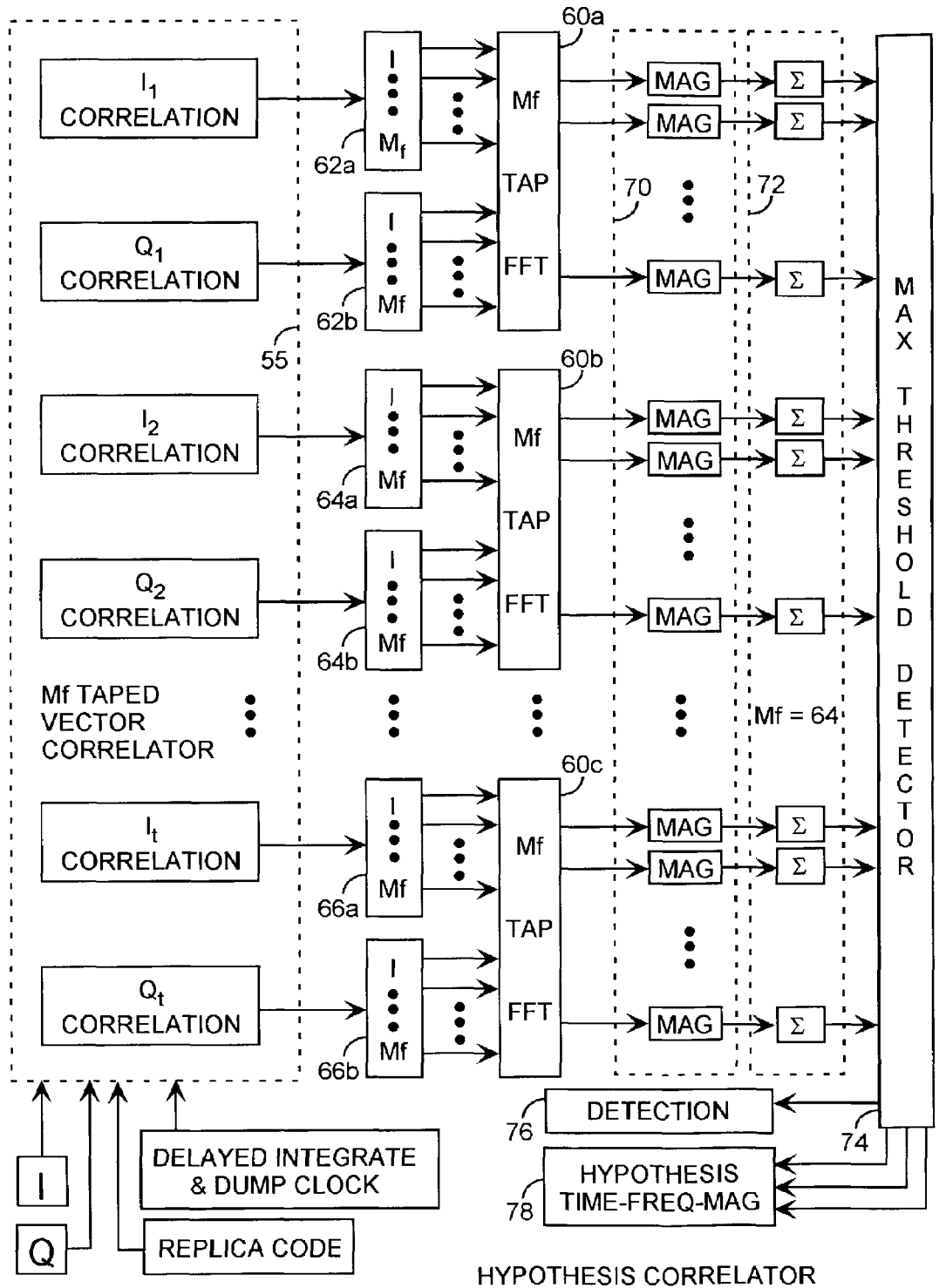
FIG. 5 is a block diagram of an Mf Hypothesis correlator.

Referring to all of the figures, and more particularly to FIGS. 4 and 5, an exemplar hypothesis correlator includes an Mt taped vector parallel correlator 50 providing, for example, 2046 I and Q correlations. The replica code is fed into a Mt=2046 tap delayed line 52 for providing 2046 respective staggered code replicas to 2046 , I and Q, parallel integrate and dump correlators 50 each receiving a respective one of the twenty delayed integrate and dump clocks for providing 2046 , I and Q, correlations 54. The 2046 I and Q correlations are fed into 2046 parallel Mf-point fast Fourier transforms (FFT) 60a, 60b through 60c, such as Mf=64 FFTs, each of which having two I and Q input shift registers, such as I and Q FFT input registers, 62a and 62b, 64a and 64c, through 66a and 66b. More generally, any discrete Fourier transform (DFT) may be used. The I and Q FFT input shift registers 62a and 62b, 64a and 64c, through 66a and 66*b* shift respective I and Q correlations from the vector correlator 54. The frequency shifted I and Q correlations from the frequency shift registers 62*a* and 62*b*, 64*a* and 64*c*, through 66*a* and 66*b* are fed into the Mf-point FFTs 60*a*, 60*b* through 60*c* for searching over parallel frequencies centered about the carrier frequency. Rapid C/A code acquisition employing 2046 parallel correlators with respective FFTs is equivalent to a C/A code matched filter with parallel frequency search. In the exemplar form, there are sixty-four parallel frequencies that are searched in parallel, and, there are 2046 Mf-point FFTs 60*a*, 60*b* through 60*c* for providing sixty-four I and Q transformed outputs for each correlator. The I and Q transformed outputs are fed to 2046 respective magnitude generators 70, each receiving an I and Q transformed output for generating 2046 respective magnitudes that are summed over time by 2046 respective noncoherent sunnners 72. The summers 72 provide accumulated magnitudes over 2046 code phase times and over 64 parallel frequencies, replicated twenty times for each of the hypothesis correlators 30*a*, 30*b*, through 30*c*. The accumulated magnitudes are fed into a maximum threshold detector 74 that generates a time and frequency and magnitude hypothesis 78 indicating the hypothesis that above the predetermined threshold that is then communicated to the multiple hypothesis selector 42 for generating the clock delay selector value 40 based on a search algorithm. The multiple hypothesis selector 42 can also generate a signal detection signal 76 for the carrier tracker 10 and acquisition controller 12.

The 2046 taped vector parallel correlator 50 enables searching over all possible times of the code phase for the exemplar C/A code, while the bank of parallel FFTs enable searching over possible carrier frequencies offsets, while the twenty delayed integrate and dump clocks enable searching over all possible bit boundaries. Hence, a GPS C/A code receiver can be adapted to search all code phase times, all carrier frequencies hypotheses and over the twenty bit boundary hypotheses to determine the correct offset that aligns an integration and dump clock to the bit boundaries for maximum coherent integration. This search algorithm tests the hypotheses in parallel by comparing each hypothesis to the threshold for all possible bit-boundary offsets, stepped frequencies and code phases. The resulting correlations for all of these values are then compared to a threshold to determine the correct bit-boundary offset, so that acquisition is declared at the start of the integration period when aligned with the bit boundary. The correct hypothesis does not suffer the loss in C/No associated with incorrect decisions. A benefit of bit boundary detection during acquisition is that noncoherent losses are reduced prior to carrier loop pull-in.

The preferred bit boundary correlation system implements parallel searching using 2046 parallel correlators and respective FFTs for each of the twenty integration hypothesis. Hence, the total number of parallel correlators required to search all bit-boundary offsets over all times in parallel is 2046×20=40920 preferably implemented using semiconductor ASIC technology. This level of parallelism is practical for low power applications especially at the low 1.023 MHz C/A code rate. The boundary search may also be implemented using a smaller number of parallel correlators or reduced number of FFTs or DFT to reduce power consumption for low power applications. A similar implementation would be employed when a reduced number of time and frequency hypotheses were searched in parallel. This time and frequency search case differs only in the implementation as a greater number of parallel hypotheses to search that is equal to twenty times the number of frequency hypotheses times the number of time hypotheses. The bit boundary hypotheses can also be searched serially by serial sampling.

Without loss of generality, a C/A code receiver preferably searches all code phase times and carrier frequencies in parallel. A serial implementation could hold the integrate and dump clock for all correlators by successively increasing values of time, in 1 ms code period increments, or use 2046 samples for two samples per code period. Then, the selector 42 compare all correlations values to a threshold to determine the correct time hypothesis corresponding to the value that provides bit synchronization as well as code synchronization. The system can also verify the bit synchronization by initiating GPS data demodulation or a separate bit synchronization process after carrier loop pull-in.

The system is well suited for applications requiring detection of weak GPS signals such as in-building E911 signaling. The system offers long coherent integration periods for improved signal detection. Invention reduces bit boundary and code phase misalignment and enables bit synchronization during acquisition. The method provides roughly 5.5. dB improvement over a 1 ms integration period for a 0.25 ppm oscillator while improving GPS receiver sensitivity and while providing bit synchronization for rapid acquisition. The system offers shorter dwell periods required for low power C/A systems that may enable use of inexpensive crystal oscillators having a drift rate of one ppm so that the dwell period is limited to less than 0.5 sec for accumulation of 0.5 C/A code period of uncertainty. Shorter overall dwell period enables the use of inexpensive imprecise oscillators. Imprecise oscillators are desirable for low cost single chip GPS receivers for use in cell phones and wristwatches. Low-cost GPS receivers used for in-building applications of GPS will likely employ imprecise crystal oscillators with drift rates in the range of 0.25 to 1 part per million (ppm), or greater. The dwell period required to achieve a given C/No in the range of performance that is practical for this level of accuracy may be computed. For the case of a receiver using a clock with an accuracy of 0.25 ppm, the bit boundary search implementation with a twenty ms coherent integration period enables one to acquire the GPS signal at roughly a six dB lower C/No level than possible using a one ms coherent integration period. This result neglects losses that will be incurred due to the 0.5 code period timing error over the course of a dwell period. Due to these losses, a receiver oscillator may be constrained to an even smaller timing error, leading to further practical restrictions on the dwell period. Even if such timing accuracy was available, however, the bit boundary search implementation enables a receiver to perform bit synchronization during acquisition. The system provides improved sensitivity to weak GPS signals during initial code and carrier loop tracking, prior to carrier loop pull-in, not possible for coherent integration periods much less than twenty ms.

The system is directed to reducing the effect of losses in C/No due to bit-boundary misalignment for the case of coherent integration beyond the one ms C/A code period. The system relies on parallel correlators for providing parallel indication of code period offsets between bit period and the replica code. Those skilled in the art can make enhancements, improvements, and modifications to the invention, and these enhancements, improvements, and modifications may nonetheless fall within the spirit and scope of the following claims.

What is claimed is:

1. A system for indicating bit synchronization of a received signal spectrum spread by a spreading code modulating data bits having a bit duration between bit boundaries extending over and synchronized to an integer number of code periods of the spreading code, the system comprising, an integrate and dump clock generator for generating a reference integrate and dump clock having a reference integration period having a duration equal to the bit duration, and for generating staggered integrate and dump clocks from the reference integrate and dump clock, the staggered integrate and dump clocks respectively indicating offsets in code period increments between the reference integrate and dump clock and the bit boundaries, one of the staggered integrate and dump clocks is synchronously aligned with the bit duration, a hypothesis correlator for correlating the received signal with a replica code of the spreading code synchronized to the reference integrate and dump clock, the hypothesis correlator receiving the staggered integrate and dump clocks for respective integration and dumping over respective integration periods respectively staggered by the offsets for respectively generating hypotheses over the respective integration periods, and a selector for selecting one of the respective hypotheses for a respective one of the offsets as a synchronized offset for one of the respective integration periods as a synchronized integration period coherently synchronized to the bit boundaries for indicating bit synchronization.

2. The system of claim 1 wherein,
the hypothesis correlator comprises parallel code correlators for generating the hypotheses in parallel.

3. The system of claim 1 wherein,
the hypothesis correlator is a code correlator receiving the staggered integrate and dump clocks for generating the hypotheses in series.

4. The system of claim 1 wherein,
the integer number is twenty,
the hypothesis correlator comprises twenty parallel code correlators for generating twenty hypotheses in parallel,
the received signal comprises I and Q components,
the spreading code is a C/A code,
the offsets are twenty offsets, and
the staggered integrate and dump clocks are twenty staggered integrate and dump clocks.

5. The system of claim 1 wherein the received signal comprises I and Q components, the hypothesis correlator comprises twenty parallel correlators respectively receiving the staggered integrate and dump clocks for respective correlation with the received signal, the staggered integrate and dump clocks are twenty staggered integrate and dump clocks, one of the twenty staggered integrate and dump clocks is synchronously aligned to the bit boundaries, each of the parallel correlators comprises, I and Q multipliers for multiplying the I and Q components with the replica code for generating respective I and Q code multiplied signals, an I and Q integrate and dump stage for receiving the respective I and Q multiplied signals and a respective one of the staggered integrate and dump clocks for providing respective I and Q correlations, and a magnitude generator for generating a respective one of the hypotheses from the respective I and Q correlations.

6. The system of claim 1 wherein the received signal comprises I and Q components, the spreading code is a C/A code, the replica code is a replica C/A code, the bit duration extends twenty code periods, the integer amount is twenty, the staggered integrate and dump clocks are twenty staggered integrate and dump clocks, one of the twenty staggered integrate and dump clocks is synchronously aligned to the bit boundaries, the hypothesis correlator comprises twenty parallel correlators respectively receiving the twenty staggered integrate and dump clocks, each of the twenty parallel correlators comprises, I and Q multipliers for multiplying the I and Q components with the replica C/A code for generating respective I and Q multiplied signals, an I and Q integrate and dump stage for receiving the respective I and Q multiplied signals and a respective one of the staggered integrate and dump clocks for providing respective I and Q correlations, and a magnitude generator for generating a respective one of the hypotheses from the respective I and Q correlations.

7. The system of claim 1 wherein the received signal comprises I and Q components, the hypothesis correlator comprises parallel correlators respectively receiving the staggered integrate and dump clocks for correlating the received signal, one of the staggered integrate and dump clocks is synchronously aligned to the bit boundaries, each of the parallel correlators comprises, a code taped delay line for receiving the replica code and generating Mt replica codes that are staggered in time by the code period, Mt vector I and Q multipliers for multiplying the I and Q components with one of the Mt replica codes for generating respective Mt I and Q multiplied signals, Mt I and Q integrate and dump stages for receiving the respective Mt I and Q multiplied signals and a respective one of the staggered integrate and dump clocks for providing respective Mt I and Q correlations, and Mt magnitude generators for generating Mt respective magnitudes for generating one of the hypotheses from the respective Mt I and Q correlations, Mt being an integer.

8. The system of claim 1 wherein the received signal comprises I and Q components, the hypothesis correlator comprises parallel correlators respectively receiving the staggered integrate and dump clocks for correlating the received signal, one of the staggered integrate and dump clocks is synchronously aligned to the bit boundaries, each of the parallel correlators comprises, I and Q multipliers for multiplying the I and Q components with the replica code for generating respective I and Q multiplied signals, an I and Q integrate and dump stage for receiving the respective I and Q multiplied signals and a respective one of the staggered integrate and dump clocks for providing respective I and Q correlations, Fourier transforms for transforming the respective I and Q correlations into respective I and Q transformations, and magnitude generators for generating noncoherent accumulated respective magnitudes from the respective I and Q transformations for generating one of the hypotheses.

9. The system of claim 8 wherein the Fourier transforms are discrete Fourier transforms.

10. A system for indicating bit synchronization of a received signal spectrum spread by a spreading code modulating data bits having a bit duration between bit boundaries extending over and synchronized to an integer number of code periods of the spreading code, the system comprising, an integrate and dump clock generator for generating a reference integrate and dump clock having a duration equal to the bit duration, and for generating staggered integrate and dump clocks from the reference integrate and dump clock, the staggered integrate and dump clocks respectively indicating offsets in code period increments between the reference integrate and dump clock and the bit boundaries, parallel hypothesis correlators for correlating the received signal with a replica code of the spreading code synchronized to the reference integrate and dump clock, the parallel hypothesis correlators respectively receiving the staggered integrate and dump clocks for respective integration and dumping over respective integration periods respectively staggered by the offsets for respectively generating respective hypotheses over the respective integration periods, and a selector for selecting one of the respective hypotheses for one of the offsets as a synchronized offset for one of the respective integration periods as a synchronized integration period coherently aligned to the bit boundaries for indicating bit synchronization.

11. The system of claim 10 wherein each of the respective hypotheses is a respective time-frequency magnitude hypothesis, the received signal comprising I and Q components, each of the parallel hypothesis correlators comprises, a code taped delay line for receiving the replica code and generating Mt staggered replica codes at Mt times staggered by the code period, Mt vector I and Q multipliers for respectively multiplying the received I and Q components with the Mt staggered replica codes for generating respective Mt I and Q multiplied signals, Mt I and Q integrate and dump stages for receiving the respective Mt I and Q multiplied signals and a respective one of the staggered integrate and dump clocks for providing respective Mt I and Q correlations, Mt Mf-point discrete Fourier transforms for respectively transforming Mt I and Q correlations into Mt sets of Mf I and Q correlations, each of the Mf I and Q correlators are offset by a carrier frequency step for extending the one respective integration period, Mt×Mf magnitude generators for generating Mt×Mf respective magnitudes from the Mt sets of Mf I and Q correlations, Mt×Mf noncoherent suimners for respectively summing the Mt×Mf respective magnitudes for generating Mt×Mf summations, and a detector for detecting the Mt×Mf summations above a threshold for generating the respective time-frequency magnitude hypothesis, Mt being an integer, Mf being an integer, Mt×Mf being a product of Mt and Mf.

12. The system of claim 10 wherein each of the hypotheses is a respective time-frequency magnitude hypothesis, the received signal comprising I and Q components, each of the parallel hypothesis correlators comprises, a code taped delay line for receiving the replica code and generating Mt staggered replica codes at Mt times staggered by the code period, Mt vector I and Q multipliers for multiplying the received I and Q components with the staggered replica code for generating respective Mt I and Q multiplied signals, Mt I and Q integrate and dump stages for receiving the respective Mt I and Q code correlations and a respective one of the staggered integrate and dump clocks for providing respective Mt I and Q correlations, Mt Mf-point discrete Fourier transforms for transforming Mt I and Q correlations into Mt sets of Hf I and Q correlations, each of the Hf I and Q correlators are offset by a carrier frequency step for extending the one respective integration period, HtxMf magnitude generators for generating Mt×Mf respective magnitudes from the Mt sets of Hf I and Q correlations, HtxHf noncoherent summers for respectively summing the HtxMf respective magnitudes for generating the Mt×Mf suimnations, and a detector for detecting the HtxMf sunmiations above a threshold for generating the respective time-frequency magnitude hypothesis, and wherein:

Mt equals 2046 and Hf equals 64;

HtxHf is a product of 2046 and 64;

the integer number is twenty;

the hypothesis correlator comprises twenty parallel code correlators for generating twenty hypotheses in parallel;

the spreading code is a C/A code;

the offsets are twenty offsets, and the staggered integrate and dump clocks are twenty staggered integrate and dump clocks.

13. A system for indicating bit synchronization of a received signal spectrum spread by a C/A spreading code modulating data bits having a twenty millisecond bit duration between bit boundaries extending over and synchronized to twenty code periods of the C/A spreading code, the system comprising, an integrate and dump clock generator for generating a reference integrate and dump clock extending the bit duration, and for generating twenty staggered integrate and dump clocks from the reference integrate and dump clock, the twenty staggered integrate and dump clocks respectively indicating twenty possible offsets in one millisecond code period increments between the reference integrate and dump clock and the bit boundaries, one of the twenty staggered integrate and dump clock is synchronously aligned to the bit boundaries, parallel hypothesis correlators for correlating the received signal with a C/A replica code of the C/A spreading code synchronized to the reference integrate and dump clock, the parallel hypothesis correlators respectively receiving the twenty staggered integrate and dump clocks for respective integration and dumping over twenty respective integration periods respectively staggered by the twenty offsets for respectively generating twenty hypotheses over the respective twenty integration periods, and a selector for selecting one of the twenty respective hypotheses for indicating one of the twenty offsets as a synchronized offset for indicating one of the twenty respective integration periods as a synchronized integration period coherently synchronized to the bit boundaries for indicating bit synchronization.

14. The system of claim 13 wherein each of the hypotheses is a respective time-frequency magnitude hypothesis, each the parallel hypothesis correlators comprises, a code taped delay line for receiving the replica code and generating Mt staggered replica codes at Mt times staggered by the code period, Mt vector I and Q multipliers for multiplying the received I and Q components with the staggered replica code for generating respective Mt I and Q multiplied signals, Mt I and Q integrate and dump stages for receiving the respective Mt I and Q code correlations and a respective one of the staggered integrate and dump clocks for providing respective Mt I and Q correlations, Mt Mf-point discrete Fourier transforms for transforming Mt I and Q correlations into Mt sets of Mf I and Q correlations, each of the Mf I and Q correlators are offset by a carrier frequency step for extending one of the respective integration period, Mt×Mf magnitude generators for generating Mt×Mf respective magnitudes from the Mt sets of Mf I and Q correlations, Mt×Mf noncoherent sunnners for respectively summing the Mt×Mf respective magnitudes for generating Mt×Mf suimnations, and a detector for detecting the Mt×Mf suimnations above a threshold for generating the respective time-frequency magnitude hypothesis, Mt being an integer, Mf being an integer, Mt×Mf being a product of Mt and Mf.

* * * * *